(No Model.)
W. WEBSTER.
EXTRACTOR FOR GREASE, GRIT, &c., FROM EXHAUST STEAM.
No. 490,461. Patented Jan. 24, 1893.
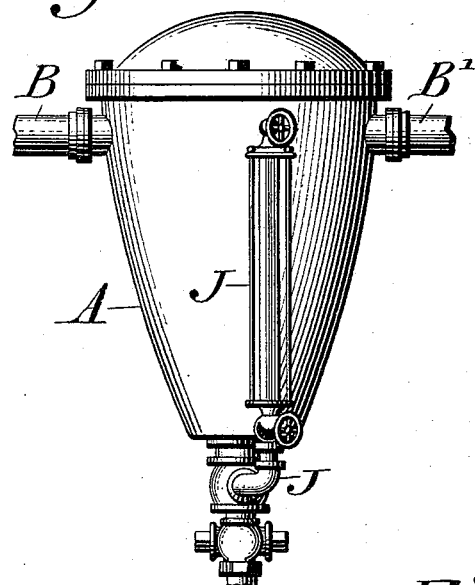
Fig. 1.
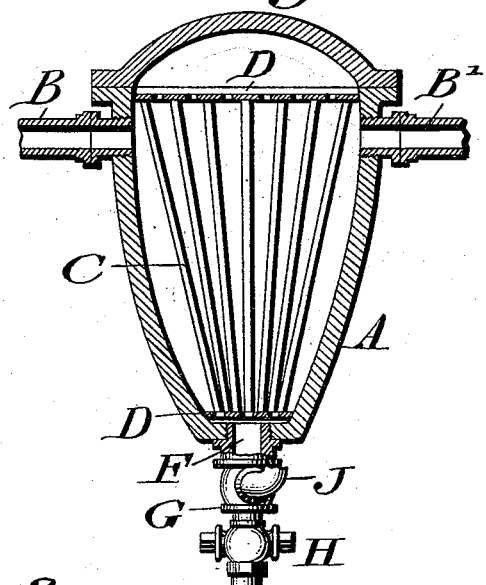
Fig. 2.
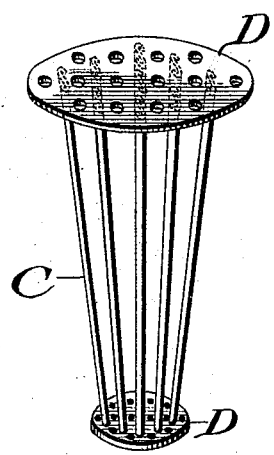
Fig. 3.
Fig. 4.
Fig. 5.
WITNESSES:
O. H. Eagles.
L. Douville.
INVENTOR
Warren Webster
BY
ATTORNEY.

UNITED STATES PATENT OFFICE.

WARREN WEBSTER, OF PHILADELPHIA, PENNSYLVANIA.

EXTRACTOR FOR GREASE, GRIT, &c., FROM EXHAUST-STEAM.

SPECIFICATION forming part of Letters Patent No. 490,461, dated January 24, 1893.

Application filed November 8, 1892. Serial No. 451,303. (No model.)

*To all whom it may concern:*

Be it known that I, WARREN WEBSTER, a citizen of the United States, residing in the city and county of Philadelphia, State of Pennsylvania, have invented a new and useful Improvement in Extractors for Grease, Grit, &c., from Exhaust-Steam, which improvement is fully set forth in the following specification and accompanying drawings.

My invention consists of an extractor for grease, &c., from exhaust steam, leaving the latter comparatively clean and dry for any use to which it may be subjected, the same embodying a receiver or vessel and a trap therein of the form of channeled or guttered plates against which the steam is impacted, and by which the heavier matters thereof are caught, as will be hereinafter set forth.

Figure 1 represents a perspective view of an extractor embodying my invention. Fig. 2 represents a central vertical section thereof. Fig. 3 represents a perspective view of the interior thereof detached. Fig. 4 represents a perspective view of one of the plates of the trap on an enlarged scale. Fig. 5 represents a top view of the plate shown in Fig. 4.

Similar letters of reference indicate corresponding parts in the several figures.

Referring to the drawings:—A designates a vessel or receiver provided with a pipe B for the inlet of steam, and a pipe B' for the outlet of the same. Within the vessel is a trap or baffle formed of vertical plates C, which are connected at top and bottom with perforated diaphragms D, D, said plates having their ends bent back in opposite directions, forming channels E, E. At the bottom of the vessel A, is a discharge opening F, below which is a branch G, having a cock H, said branch having also connected with it the gage or column J, which is in communication with the vessel A, simply to indicate that the latter is completely drained, and there is no water therein.

The operation is as follows:—Steam is admitted into the vessel and thus impacts against the plates C, whereby the heavier matters such as oil, grease and grit are caught or trapped by the gutters or channels of the same, while the steam which is thus left in dry and clean condition, escapes from the vessel through the pipe B', and may be directed to a place of service or use elsewhere. The oil and grit flow down the respective channels or gutters E, and so reach the outlet F and branch G, by which latter they are removed from the vessel and they may be collected by any suitable means. The water of condensation may also escape with the oil and grit, and the latter may be separated from the former in any desired manner. As the channels or gutters E are on opposite sides of the baffle or trap plates, it is evident that the device is operative if steam is admitted into the vessel through the pipe C', and discharged through the pipe B', the reverse of that previously described.

The plates C converge from the top to the bottom diaphragms, so as to gather at or near the outlet F.

The trap as formed is skeleton in character, and of light weight, requiring little material in its construction. The upper diaphragm rests in the receiver above the inlet and outlet pipe, so that the plates which are separated from each other can have unobstructed action. Owing to the converging form of the plates C, the oil, grit, &c., are directed from the widened top of the vessel A to the narrow end thereof, where the outlet F exists, the base of each gutter formed by said plates thus being in communication with said outlet.

Having thus described my invention, what I claim as new, and desire to secure by Letters Patent, is:—

1. An extractor for the purpose named consisting of a steam receiver having inlet and outlet pipes on opposite sides, and a discharge opening in the lower end thereof, and a trap within said receiver formed of vertical plates connected at top and bottom with perforated diaphragms, said plates having turned edges forming gutters, said parts being combined substantially as described.

2. A steam receiver with a skeleton trap formed of separated vertical plates having edges forming gutters, and perforated diaphragms, and inlet and outlet passages between said diaphragms, said parts being combined substantially as described.

3. In an extractor for the purpose set forth, channeled baffle or trap plates, in combination with a containing vessel provided with inlet and outlet pipes, and a discharge opening, said plates converging at said discharge opening, substantially as described.

WARREN WEBSTER.

Witnesses:
JOHN A. WIEDERSHEIM,
A. P. JENNINGS.